Jan. 17, 1967 H. W. BARCH ETAL 3,298,809
METHOD OF PRESS BENDING VERTICALLY SUPPORTED GLASS SHEETS
Filed June 20, 1963
FIG. 1
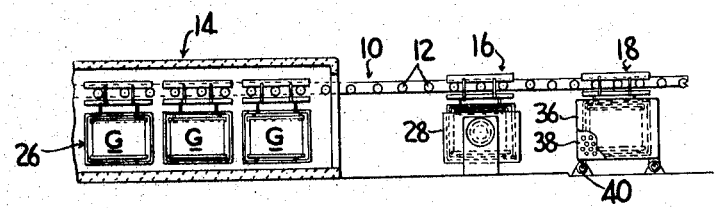
FIG. 2
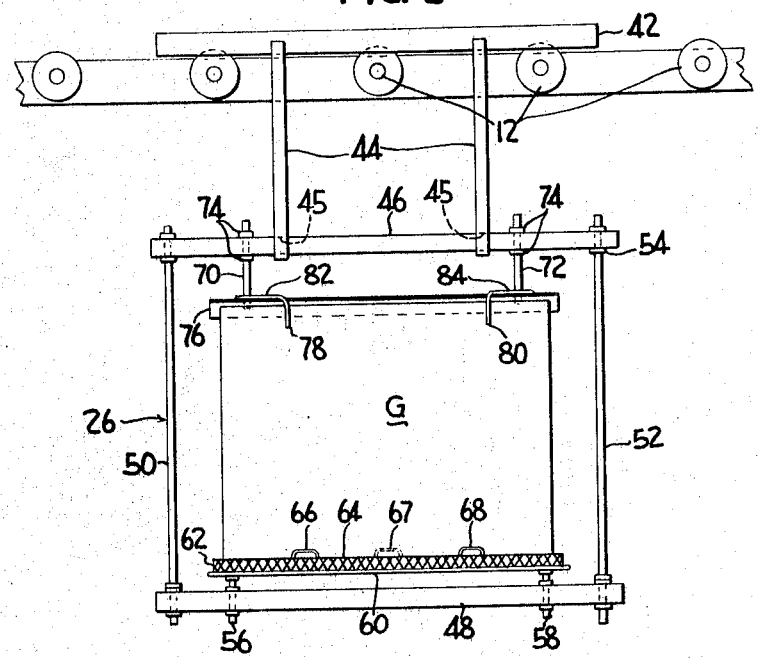
FIG. 3     FIG. 4     FIG. 5
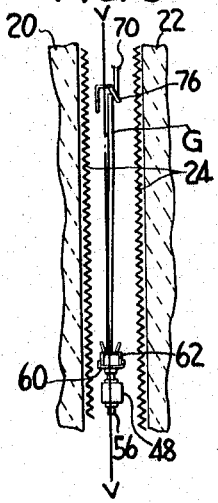 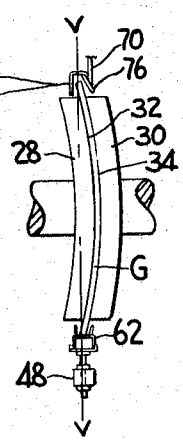 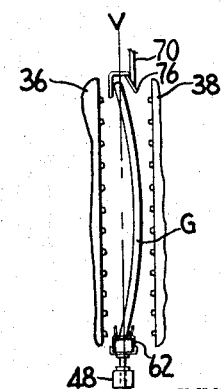
INVENTORS
HERBERT W. BARCH and
CLEMENT E. VALCHAR
BY
Oscar L. Spencer
ATTORNEY 3,298,809
METHOD OF PRESS BENDING VERTICALLY
SUPPORTED GLASS SHEETS
Herbert W. Barch, Natrona Heights, and Clement Edward Valchar, Tarentum, Pa., assignors to Pittsburgh Plate Glass Company, Pittsburgh, Pa., a corporation of Pennsylvania
Filed June 20, 1963, Ser. No. 289,326
4 Claims. (Cl. 65—106)

This application relates to improvements in treating glass and particularly refers to improvements in shaping glass sheets about a single axis of curvature wherein flat glass sheets are supported in an upright position, heat-softened to a temperature where the glass sheet is deformable by pressure, shaped by pressurized contact between convex and concave shaping surfaces of complementary shaping members defining a curvature desired for the glass sheet, and cooled thereafter to temper the shaped sheet.

There are two techniques employed in supporting a glass sheet in an upright position for its shaping by the so-called "press bending" operation described above. One involves gripping the glass near its upper edge by tongs and freely suspending the glass therefrom. This method imparts tong marks and localized stresses in the vicinity of the tong gripping points. Therefore, other alternative support means which would avoid the use of tongs is desirable.

Another method for supporting glass sheets involves supporting the bottom edge and engaging the upper edge by means of spaced balancing members which loosely hold the glass in balanced position in a substantially vertical plane. The prior art spaced balancing members tend to indent the heat-softened glass at their spaced points of balancing because they support a substantial portion of the weight of the glass during its heating, and impress large localized forces that cause distortion at the points of balancing.

If the glass is shaped to a bend about a vertical axis of curvature, it is necessary that the balancing members be located in a particular location where the contour of the curved glass intersects the plane occupied by the unbent glass. However, the bottom edge of the glass sheet slides relative to the bottom edge support means during shaping, except for those points where the curved contour intersects the unbent glass. This sliding causes the bottom edge to spall, to develop localized stresses that weaken the edge and cause frictional forces that tend to cause the shape of the bent sheet to depart from the desired curvature.

Orienting the glass sheet to shape the latter about a horizontal axis of bending also presents problems. When suspended from tongs, the mass of the heat-softened glass applies a downward force tending to straighten the bent glass sheet, depending on a time and temperature relationship based on the delay involved between shaping and cooling the glass sheet. This distortion factor is reduced somewhat when the glass is supported at its bottom edge while balanced in an upright position.

The present invention provides additional improvements in bending glass sheets while supported on their bottom edge and balanced at their upper edge for bending about a single axis. The improvements provided by the present invention are especially important in the production of complicated glass articles, such as curved automobile sidelights, which have become quite popular in recent years.

The present invention provides a method and apparatus whereby glass sheets are bent about horizontal axes of bending between the shaping surfaces of complementary shaping members without causing the bottom edge of the glass sheet to move or slide along its bottom edge support means.

The present invention also avoids substantially all the local deformations caused by balancing the upper portion of the glass sheet against spaced balancing members during the relatively long time that the glass is at elevated temperatures at which the glass sheet deforms rather quickly.

The present invention avoids some of the problems of the prior art enumerated above by bending the glass about a horizontal axis. It also minimizes the localized deformations caused by prior art balancing techniques. The present invention has its optimum use in a bending and tempering operation wherein the glass sheet is supported along its bottom edge, balanced at its upper edge in a substantially upright position, heat-softened to a temperature wherein the glass sheet is deformed by pressure from the shaping members and subsequently cooled sufficiently rapidly to temper the shaped sheet.

According to a method suggested by the present invention, a glass sheet is first balanced in an oblique plane of support disposed at a small acute angle to one side of a vertical plane by contacting one surface of its upper edge portion along a substantial portion of its length by a balancing member during its heating. When the glass sheet is shaped, it is pivoted out of contact with the balancing member about a horizontal axis extending along its bottom edge. During its cooling immediately following its shaping, the glass sheet is subjected to a slight pressure differential sufficient to cause the glass sheet to pivot slowly into an oblique support plane disposed to the other side of the vertical plane intersecting the supported bottom edge of the sheet. In this latter orientation, the upper edge of the cooling glass sheet rests on spaced supports.

The support along a substantial portion of the length of the upper edge during the heating portion of the operation reduces the localized pressure on any single point along the upper edge of the glass sheet during most of the time the glass is soft enough to be deformable. This type of support during bending avoids a problem inherent in the prior art, namely, the tendency of the glass sheet to deform at spaced points from its desired curvature.

Tilting the glass sheet to an oblique plane on the other side of the vertical plane intersecting its bottom edge support after the glass is shaped and while undergoing cooling enables the glass to be balanced at spaced points along its upper edge during a time when the glass is undergoing chilling. At this time the glass is less likely to deform because it already has been cooled below its deformation temperature before its upper edge contacts the spaced balancing members. The spaced points of support for the upper edge permit free access of the quenching fluid onto the upper edge of the glass sheet so as to enable the glass to be cooled uniformly and avoid the imposition of localized stresses which tend to weaken the glass.

Preferably, the glass initially rests with the upper edge of the surface to be formed to a convex shape balanced on the member providing support for substantially its entire length. This orientation enables the glass to begin to slump by gravity in the desired direction an imperceptible amount sufficient to start bending the glass sheet in the proper direction preparatory to the press bending operation. Therefore, a refinement of the present invention involves supporting the glass sheet in an oblique plane so that its surface that is to be contacted with the concave shaping member has its upper edge supported in contact along a substantial portion of its length during the heating step.

The apparatus aspect of the present invention suggests that a novel construction be employed to balance the upper edge of a glass sheet supported along its bottom edge. This novel balancing structure comprises a first upper edge contacting member extending longitudinally in a horizontal direction a minimum distance equal to a substantial portion of the length of the glass sheet and located on one side of a vertical plane intersecting the bottom edge support and a pair of longitudinally spaced upper edge contacting members located on the other side of the vertical plane. The pair of the upper edge contacting members are spaced from the first upper edge contacting member a distance slightly greater than the thickness of the glass sheet. The space preferably exceeds the glass thickness by 1/8 inch to 1 inch.

The present invention will be understood more fully in the light of a description of a typical apparatus incorporating the present invention.

In the drawings which form part of the present description, and wherein like reference numbers refer to like structural elements, FIG. 1 is a longitudinal schematic view of a typical conveyor line extending through a furnace, a shaping station, and a quenching station;

FIG. 2 is an enlarged longitudinal elevation of a glass support structure;

FIG. 3 is a fragmentary sectional view showing the manner in which the glass sheet is supported with respect to the glass support apparatus while being heated;

FIG. 4 is a fragmentary view similar to FIG. 3, showing the relation of the glass sheet to its support apparatus while it is being shaped; and FIG. 5 is a view similar to FIGS. 3 and 4, showing how the glass sheet is supported with respect to the glass support apparatus while it is being quenched.

In FIG. 1, a conveyor 10 comprising a plurality of conveyor rolls 12 mounted on a conveyor support structure extends sequentially through a heating furnace 14, a shaping station 16 and a quenching station 18, in a manner well known in the art. The furnace comprises a pair of vertical walls 20 and 22 of refractory material which support electric heating elements 24 (FIG. 3). The heating elements are energized to irradiate at a temperature sufficient to raise the average temperature of the walls to about 1400 degrees Fahrenheit. At this temperature, about 4 minutes are required to raise the temperature of a sheet of soda-lime-silica glass such as commercial plate glass or commercial sheet glass 1/4 inch thick sufficiently for it to be shaped and quenched to a temper satisfactory for commercial requirements.

A series of glass support carriages 26 are mounted for movement along the conveyor 10. The speed of movement is controlled to enable the glass sheet G supported on each glass support carriage 26 to be heated to the proper temperature and brought to the pressing station 16 at the proper temperature.

The shaping station 16 comprises complementary shaping members 28 and 30 disposed on the opposite sides of the path of movement for glass sheets G traversing the conveyor 10. The shaping member 28 has a glass facing shaping surface 32 of convex configuration disposed about a horizontal axis of curvature, and the shaping member 30 is provided with a glass facing shaping surface 34 of concave configuration that is complementary to the shaping surface 32 of the convex shaping member 28.

The quenching station 18 comprises a pair of plenum chambers 36 and 38 having nozzle openings extending toward one another and provided with cam actuators 40 for moving the nozzle boxes in closed overlapping orbital paths so as to quench the glass. Motor means for the cam actuators 40 and the blowers supplying air under pressure for the plenums or nozzle boxes 36 and 38 are not shown, as they are old in the art.

Each glass supporting carriage 26 comprises an upper beam 42 that rests upon the upper surface of the conveyor rolls 12 and is driven along the conveyor upon rotation of the rolls. A pair of rods 44 extend arcuately downwardly from their upper point of connection to the upper beam 42 and are shaped so as to clear the conveyor rolls 12. The bottom ends of the rods 44 are apertured to form sleeves 45 rotatably receiving an upper horizontal bar 46 of a frame for a glass sheet support and balancing means. The upper horizontal rod 46 is connected to a lower horizontal square tube 48 through spaced vertical rods 50 and 52 to form the frame.

The latter two vertical rods 50 and 52 are screw-threaded near their longitudinal extremities and are provided with lock nuts 54 securely adjusting the distance between the upper horizontal rod 46 and the lower horizontal rod 48 as desired, to enable the frame 46, 48, 50, and 52 to have its vertical dimension changed as desired.

The lower horizontal square tube 48 is apertured at its upper and lower walls intermediate its longitudinal extremities to receive vertical rods 56 and 58. These are suitably threaded to receive lock nuts above the upper and lower surfaces of the square tube 48 and to position the vertical rods 56 and 58 as desired with respect to the lower horizontal square tube 48.

An elongated channel member 60 is secured to the upper end of the vertical rods 56 and 58 and extends substantially horizontally as a bottom support for an inverted channel member 62 of expanded metal. The inverted channel member 62 has an upper web portion 64 which extends in a horizontal plane intersected by a vertical plane V—V and serves as means for supporting the bottom edge of the glass sheet G along substantially its entire length along a line of support defined by the intersection of these two planes.

Thin short staple-like members 66, 67, and 68 are attached to the web 64 of the inverted channel member 62 and extend upward a short distance at alternately opposite sides of the longitudinal center line of the web portion 64. Members 66 and 68 are disposed in a common vertical plane to one side of the longitudinal center line of web member 64 and bottom edge balancing member 67 is disposed on the other side of the longitudinal center line of the web portion 64. The distance between the vertical plane parallel to the longitudinal center line containing bottom edge balancing members 66 and 68 and that containing bottom edge balancing member 67 is slightly greater than the thickness of a glass sheet supported thereon.

The members 66, 67, and 68 are in the form of thin, short staples. The prongs of the staples are engaged where desired in the web portion 64 of the inverted channel member of expanded metal 62 so as to be in the proper position to accommodate for different thicknesses of glass sheets to be supported by the glass support mechanism of the present invention.

The upper horizontal rod 46 is apertured inward of each extremity at its upper and lower walls to receive an additional pair of support rods 70 and 72. The latter support rods are exteriorly threaded to be adjustable vertically with respect to the horizontal rod 46. Lock nuts 74 threaded onto support rods 70 and 72 above and below the upper horizontal rod 46 determine the position of the support rods 70 and 72 relative to the horizontal rod 46. Support rods 70 and 72 are used to attach means for engaging the upper edge of the supported glass sheet to the frame 46, 48, 50, and 52.

The upper glass edge engaging means is an important element of the present invention and comprises a first glass upper edge contacting member 76 extending horizontally at least a substantial portion of the length of the glass sheet to be treated. The member 76 is composed of metal or other refractory material and is about one inch wide, has a thickness less than that of the glass sheet undergoing shaping and tempering. Its inner surface which contacts one surface of the glass sheet extends obliquely upward and inward at an angle of about 30 degrees from the vertical. A pair of pins 78 and 80 extend vertically downward in a vertical plane spaced between about 1/8 inch to about 1 inch plus the thickness of the glass sheet from the inner surface of the first glass upper edge contacting member that makes line contact with the upper edge of the glass sheet. The downwardly extending pins 78 and 80 have horizontal portions 82 and 84, respectively, which are connected to the upper portion of the first glass contacting member 76. Pins 78 and 80 are preferably formed of 1/8 inch diameter stainless steel rod. Typical preferred compositions are stainless steels containing 18 percent by weight of chromium, 8 percent by weight of nickel, such as 302 and 304 stainless steels.

For supporting glass sheets having a thickness between 3/16 inch and 1/4 inch, the preferred structure for the upper glass edge contacting member 76 is a solid bar 1 inch wide and 1/8 inch thick of stainless steel of the 18–8 family (18 percent by weight of chromium and 8 percent by weight of nickel) such as types 302 and 304 stainless steels. Other suitable but less desirable alternatives include expanded metal or a sintered bar of a metal, preferably stainless steel. The latter alternatives comprise porous metal supports. Other refractory materials having the requisite combination of high temperature rigidity and relatively low thermal capacity compared to that of the upper glass edge portion adjacent thereto include other refractory materials such as carbon blocks, Marinite (a refractory composition having a representative weight analysis of: $SiO_2$—50.64; total iron (as $Fe_2O_3$)—17.80; $Al_2O_3$—6.28; CaO—10.77; MgO—4.86; $Na_2O$—0.66; $SO_3$—0.12 and having a weight loss of 9.90 percent on ignition), ceramic tubing and other metals that retain their structural rigidity and do not oxidize at temperatures up to the glass softening point.

The maximum thickness of the member 76 must be limited to a thickness such that its thermal capacity does not retard the heating rate of the upper edge portion of the glass sheet undergoing heating compared to that of the central region of the glass. For types 302 and 304 stainless steel members used to balance sheets of commercial plate or sheet glass of the soda-lime-silica type, it is necessary that the maximum thickness of member 76 not exceed the glass thickness when the member is solid, and the preferred range of thickness for the upper glass edge supporting bar 76 should be at least 1/8 inch and not more than 1/4 inch. The minimum thickness of this proposed range provides structural rigidity and stability to avoid distortion during thermal variations and to provide mechanical stability during handling. The maximum thickness of the suggested range is determined by the effect of the thermal capacity of the upper glass edge supporting bar to retard the heating rate of the adjacent portion of the glass sheet unduly.

In a typical operation for bending a glass sheet 16 inches high, 24 inches long and 1/4 inch thick, the glass sheet G was supported in a tilted position with its bottom edge resting on the web portion 64 of the inverted channel member and its upper edge in contact over a substantial portion of its length against a first glass upper edge contacting member 76.

The glass sheet was heated while conveyed through a furnace until its surface temperature reached 1200 degrees Fahrenheit. This took approximately 4 minutes in the furnace. The glass was then conveyed into the shaping station 16 where the surface of the glass sheet whose upper edge portion was in contact with the member 76 was contacted by the concave shaping surface 34 of the shaping member 30 and tilted into vertical plane V—V. Convex shaping member 28 then engaged the opposite surface of the softened glass sheet to shape the latter to conform to the complementary shaping surfaces of the shaping members.

About 2 seconds elapsed from the time the glass sheet was removed from the furnace and transferred into the shaping station. It took about 2 seconds to close the shaping members into pressurized contact against the opposite surfaces of the glass sheet. The shaping members maintained pressurized contact for approximately 2 seconds and then retracted.

The glass sheet was supported during the heating operation with its upper edge disposed to the right of a vertical plane V—V passing through the center of the bottom edge of the glass sheet. The upper edge of the surface to be engaged later by the concave shaping member was supported along a substantial portion of its length.

During the shaping operation, the bottom edge continued to rest in the plane V—V, but its upper edge was displaced from the slightly oblique plane of support for the glass during its heating to approximately the vertical plane V—V with its upper edge out of contact with elements 76, 78, and 80. The shaping members formed the heat-softened glass sheets into curved shapes of 60 inch radius of curvature about a horizontal axis of bending.

The glass sheet after shaping had its center of gravity located slightly to the right of the vertical plane V—V. Hence, the center of gravity of the glass sheet tended to rotate the glass sheet slowly to the right about the supported bottom edge of the glass sheet until the upper edge of the shaped glass again contacted the member 76 when the shaping members were retracted.

The glass sheet transport into the quenching station 18 began as soon as the retraction of the shaping members permitted clearance for moving the glass sheet. This transport consumed about 2 seconds. The orifices of the nozzles from plenum box 38 were spaced 5 inches from the orifices of the nozzles of plenum chamber 36, and pressure of 5 ounces per square inch was applied through the nozzles of plenum chamber 38 and only 4 ounces per square inch through the nozzles of plenum chamber 36. This difference of 1 ounce per square inch pressure caused the glass to pivot slowly in a counterclockwise direction, as seen in FIG. 5, until the upper edge of the concave surface of the glass rested against the pins 78 and 80 while it was quenched.

The glass did not contact the pins until after it had cooled somewhat. This cooling reduced the tendency of the upper edge to develop localized distortions at the spaced points of contact, because cooling hardened the glass surface before the balancing contact was established.

It is preferable that the glass shaping members contact the opposite surfaces of the glass sheet according to the sequence of contact taught by application Serial No. 130,028 of James H. Cypher, filed Aug. 8, 1961, now U.S. Pat. No. 3,162,521. According to the teachings of the aforesaid application, the shaping member 30 having the concave shaping surface 34 first contacts one surface of the glass sheet while the convex shaping member is spaced from the other glass sheet surface. The concave shaping surface stops in supporting relation to glass sheet before the convex shaping member engages the opposite surface.

Using the glass support apparatus of the present invention, the glass sheet pivots about its bottom edge supported on the upper horizontal surface of web portion 64 of the bottom edge support member 60 until both the upper and lower extremities of the concave shaping member 30 are in contact with the glass. At this point, the concave shaping member comes to rest supporting the glass sheet in vertical plane V—V.

The convex shaping member 28, which has been moving toward the other surface of the glass sheet G, is still spaced a slight distance from the glass sheet when the concave shaping member 30 comes to rest with its upper and lower ends disposed in a vertical plane parallel to the first surface of the glass sheet, shown to the right in FIGS. 3, 4, and 5. Thus, the glass sheet is first tilted from an oblique plane to the right of a vertical plane, as seen in FIG. 3, as the upper portion of the concave shaping member engages the glass sheet, until both upper and lower edges of the concave shaping member are supporting the glass sheet in an upright position in vertical plane V—V.

The concave member thus provides support in a vertical plane for the glass sheet during its shaping operation. In this plane, the upper edge of the glass is free from contact with the balancing means 76 or 78 and 80. This stopping of the concave member when both upper and lower extremities thereof contact the glass avoids any sliding of the bottom edge of the glass with respect to the bottom edge support member provided by web portion 64 of the elongated inverted channel member 62.

Subsequently, as the convex shaping member 28 moves into contact with the opposite surface of the heated glass sheet, the glass sheet becomes shaped, but its upper and bottom edges remain supported in vertical plane V—V as shown in FIG. 4.

During this period, the glass sheet has cooled somewhat by virtue of its removal from the furnace. Hence, the glass sheet is less likely to slump at this time than when it was in the furnace.

At the quenching station, the combination of the outward bowing of the glass sheet toward the plenum 38 and away from the plenum 36 and the slightly higher pressure (about one ounce per square inch differential for a sheet of glass 20 inches high and ¼ inch thick) applied to the convex glass surfaces cause the glass to be cooled additionally while being pivoted in a counterclockwise direction until its upper edge of the opposite surface from that initially supported comes into contact with the spaced upper edge supporting elements or pins 78 and 80. Thus, the present invention enables the upper edge of the glass to be relatively free from marks resulting from contact and support, or balancing support provided by balancing members such as provided by the prior art.

The present invention avoids having spaced, localized contact for the upper edge of the glass sheet throughout the heating and shaping operation. The present invention avoids supporting the mass of the glass over very small localized regions thereby resulting in relatively high deformation pressures. Instead, the present invention supports the upper edge of the glass sheet along a substantial portion of its length during heating. The deformation pressure against the glass by the upper edge supporting member 76 is relatively small during the heating portion of the bending cycle because the force is applied over a relatively large area compared to the area provided by the localized balancing members of the prior art.

In addition, any line of deformation at the upper edge caused by heating is pressed out during shaping. The additional balancing by the upper edge supporting member 76 after shaping occurs at a lower temperature than furnace temperature for a sufficiently short time to avoid any observable deformation.

The opposite surface, which ultimately forms the concave surface of the bent glass sheet, does not come into contact with the pins or upper edge support elements 78 and 80 until after the glass has become somewhat chilled by quenching. Thus, substantially the entire upper edge is exposed to the quenching blast and the major surfaces in contact with the pins 78 and 80 are cooled somewhat, thus reducing the tendency of the pins 78 and 80 to deform the glass in the manner inherent in the prior art.

In the prior art where the glass is contacted locally throughout the heating and throughout the quenching subsequent to shaping, and wherein the glass shaping members have notched out portions providing clearance for the glass contacting members, the notched out portions of the shaping members produced an outline of the notch in the shaped glass which provided optical distortion. The present invention does not produce such an obvious optical defect.

The shaping members have their upper and lower edges disposed slightly within the upper and lower edges of the curved glass sheet. Thus, any edge marking produced by press bending caused a straight line of marking which is only visible on a special distortion detection instrument, but not to the naked eye.

The form of the invention shown and described in this disclosure represents an illustrative preferred embodiment thereof. It is understood that various changes may be made without departing from the spirit of the invention as defined in the claimed subject matter which follows:

What is claimed is:

1. In the art of shaping a glass sheet wherein the sheet is supported in an upright position from its bottom edge, heat-softened to a temperature where the glass sheet is deformable by pressure, shaped while softened by pressurized contact between convex and concave shaping surfaces of complementary shaping members defining a curvature of bending and the bent sheet is cooled thereafter to temper the latter, the improvement comprising balancing the glass sheet in a first oblique plane disposed at a small acute angle to one side of a vertical plane by contacting one surface only of its upper edge portion with a solid member along a substantial portion of its length during its heating, moving the upper edge out of said contact during its shaping, and balancing the glass sheet in a second oblique plane disposed at a small acute angle to the other side of said vertical plane by contacting the other surface of said upper edge portion along spaced points only during its cooling with said one surface maintained out of contact with any solid member.

2. A method of shaping a glass sheet comprising supporting said glass sheet along a lower edge thereof, orienting said glass sheet in an oblique plane of support, heating the glass sheet while so supported to a temperature high enough to begin to slump said heated glass sheet by gravity and to permit press bending thereof, and press bending said heated glass sheet while at such temperature by engaging its uppermost major surface with a convex shaping member and its lowermost major surface with a concave shaping member.

3. A method of shaping a glass sheet comprising supporting said glass sheet along a lower edge thereof, orienting and maintaining said glass sheet in an oblique plane of support disposed to one side of a vertical plane, heating the glass sheet while so supported to a temperature high enough to permit press bending thereof, and press bending said hot glass sheet by engaging said sheet in pressurized engagement between shaping members while said sheet is softened by said heating.

4. In the art of tempering a glass sheet wherein the sheet is supported in an upright position from its bottom edge, heat-softened to a temperature at which the glass sheet is subject to deformation, and the heated sheet is cooled thereafter to temper the latter, the improvement comprising balancing the glass sheet in a first oblique plane disposed at a small acute angle to one side of a vertical plane by contacting one surface only of its upper edge portion with a solid member along a substantial portion of its length during its heating, moving the upper edge out of said contact upon completion of said heating, and balancing the glass sheet in a second oblique plane disposed at a small acute angle to the other side of said vertical plane by contacting the other surface of said upper edge portion along spaced points only during its cooling with said one surface maintained out of contact with any solid member.

References Cited by the Examiner

UNITED STATES PATENTS

| | | | |
|---|---|---|---|
| 2,042,610 | 6/1936 | Littleton | 65—115 |
| 2,263,005 | 11/1941 | McClure | 65—287 X |
| 3,220,818 | 11/1965 | Barch et al. | 65—106 |

References Cited by the Applicant

UNITED STATES PATENTS

| | | |
|---|---|---|
| 2,518,896 | 8/1950 | Jendrisak. |
| 2,766,555 | 10/1956 | Jendrisak. |

DONALL H. SYLVESTER, *Primary Examiner.*

A. D. KELLOGG, *Assistant Examiner.*